3,067,044
MODIFIED SHELLAC PRIMER COATINGS

Herbert N. Johnston and Delmar E. Lindner, Columbus, Ohio, assignors, by mesne assignments, to American Bleached Shellac Manufacturers Association, Inc., New York, N.Y., a corporation of New York
No Drawing. Filed June 22, 1959, Ser. No. 821,666
13 Claims. (Cl. 106—14)

This invention relates to coating compositions for metals, for providing a corrosion-inhibiting prime coating or film which serves as a base coat for a protective finish. More particularly, the invention concerns wash primer coating compositions containing a pigmented shellac reaction product for providing a film or coating having improved properties of corrosion resistance and adhesiveness.

Chemical treatments of substrates, such as metal surfaces, to render them resistant to corrosion and to provide a suitable surface to which a protective coating will adhere, have been sought extensively in the past. Acid treatments, such as phosphoric acid in water, have been used to form a metal-phosphate layer on metals. Results of such a treatment are somewhat erratic and require the application of a protective paint to the phosphate layer soon after the phosphoric acid treatment. Without such a paint top-coating, little protection from atmospheric exposure is provided. Such treatments are more suited to production-line finishing than to outdoor finishing. Further developments in chemical treatments in this art have resulted in obtaining somewhat better resistance to exposure. Wash primers, which represent both a metal treatment and an organic coating, are one of the relatively more recent developments for this purpose. Generally, such wash primers are applied to the substrate to deposit a film or coating which serves as a base coat for a protective organic-base topcoating of a paint, enamel, lacquer, or other protective material. With wash primers, by such procedures greater protection may be obtained than by applying the protective coating directly to the substrate.

Among conventional wash primers is a WP-1-type wash primer, which is a two-package system employing a dispersion of basic zinc chromate, polyvinyl butyral resin, and solvents in one package, and a phosphoric acid diluent in the other package. When the solutions of the two packages are mixed together, a wash primer composition is obtained from which a film may be deposited provided the composition is used within a limited time. Unfortunately, such conventional WP-1 primer compositions are stable for only very short, limited times, generally less than 8 hours. Prompt usage of these conventional WP-1-type wash primers is necessary. Upon standing or storage for periods longer than the limited times, the conventional WP-1-type primers undergo gelation, or other detrimental action, making it impossible or impracticable to use such primers with satisfactory results. Marketing of such a WP-1-type polyvinyl butyral wash primer requires two packages, and, because of the short useful life of the primer, requires the giving and following of careful instructions as to mixing and using.

Heretofore, shellac has not been widely accepted as a primer coating for such substrates as metals, primarily because of its tendency to absorb water when in contact therewith, resulting in the familiar milky-white water spots. Even in view of such characteristics, shellac has continued to find extensive applications for other coating purposes because of its other characteristics, such as its exceptional ability to form very hard coatings; its rapid drying and nonshattering properties; and its attractive light color in the case of bleached shellac.

Because of these desirable properties, shellac has been the object of considerable research for the purpose of extending the uses of shellac. As is true of so many natural products, particularly of animal origin, shellac is a highly complex material. As yet, the exact chemical constitution of shellac remains uncertain. Therefore the researcher and inventor has been handicapped by the fact that the primary material of the research is of uncertain chemical constitution. In view of this, it has been practically impossible to predict with any degree of certainty the results of various modifications of shellac which are attempted.

A WP-1-type wash primer minus many of the foregoing prior art disadvantages would be desirable. Such a primer, incorporating the superior coating characteristics of shellac, would be still more desirable. A relatively stable WP-1-type wash primer, or a WP-1-type wash primer of improved stability would simplify and avoid the requisite procedures for handling the present-day two-package WP-1 wash primers. Additionally, superior corrosion inhibition and adhesion from readily available low-cost raw materials and superior resistance to blistering from exposure to water or salt water or fog would provide desirable and advantageous improvements in the art. These and other advantageous results are readily obtainable with the shellac wash primers of this invention.

It has been discovered that shellac can be modified to form an excellent pigmented wash primer, free from gelation for several months and suitable for application to metal surfaces. This may be accomplished by modification of shellac, while dissolved in an organic solvent, through treatment with a dispersed chromate pigment and a solution containing phosphoric acid. The resulting composition of such a treatment is a pigmented WP-1-type shellac wash primer, containing a shellac reaction product, from which an adherent, protective prime coating or film may be deposited. Compared to conventional WP-1-type wash primers and coatings therefrom, the wash primers of this invention are characterized by superior stability, and the coatings therefrom are characterized by improved adhesion to metals, an ability to inhibit corrosion, and a superior blistering resistance.

In accordance with this invention, shellac, while dissolved in an organic solvent, is treated with a phosphoric acid solution. The use of a chromate also is essential. The chromate may be present in the shellac solution upon treatment with the phosphoric acid solution. Alternatively, the chromate, which is dispersed in a solvent for shellac, may be added to the shellac solution after its treatment with the phosphoric acid solution. Generally, it is convenient to prepare first a base grind comprising the shellac and the chromate in a shellac solvent. This base grind may be prepared with conventional equipment by milling or grinding a mixture of shellac, chromate, and solvent to obtain a smooth dispersion. The phosphoric acid solution is then prepared and slowly added with thorough mixing to the base grind to minimize and to avoid pigment flocculation. By the alternative procedure, the phosphoric acid solution is mixed with the shellac, which is dissolved in an organic solvent, and the chromate which is dispersed in an organic solvent, subsequently added thereto with a somewhat lesser tendency for pigment flocculation. Pigment flocculation sometimes occurs during preparation of the base grind and more frequently may occur upon treatment with the phosphoric acid solution. Many of the primers recover from this flocculated state within a short time after the phosphoric acid tretament. In other primers of the invention, little or no pigment flocculation occurs. However, whether pigment flocculation is, or is not, present in the primers, it appears to have little or no detrimental effect on the stability of the primer or the adhesiveness and corrosion inhibitiveness of the prime films or coatings.

Dissolving of the shellac in a volatile, organic solvent may be accomplished at normal room temperatures. Slightly elevated temperatures accelerate the solvation. The treatment of the shellac solution, or the shellac solution with the chromate dispersed therein, also proceeds at normal room temperatures with formation of a shellac reaction product. Preferably, the phosphoric treatment is carried out over a period of 15 to 30 minutes. Preferably normal room temperature of 80°±20° F. are employed for the formation of the shellac reaction products, although somewhat higher temperatures are operable and may be desirable in some instances.

The pigmented shellac wash primers of this invention exhibit excellent adhesion to a variety of substrates, such as stainless steel, cold-rolled steel, blue-annealed steel, galvanized steel, magnesium, aluminum plate, copper, and aluminum foil. Excellent adhesion also is obtained on glass surfaces. Application of the wash primer to the substrates is accomplished readily by conventional means, such as spraying, dipping, brushing, draw-coating, and the like. Protective finishes of paints, lacquers, enamels and the like then may be applied over the prime film or coating and adhere exceptionally well thereto.

In the invention desirably and preferably the shellac is a refined, bleached shellac, although other grades of shellac may be employed for some purposes. Volatile, organic solvents for shellac may be employed that are well known in the art. Included among such shellac solvents are: glycol ethers, such as ethylene glycol monoethyl ether, diethylene glycol monoethyl ether; refined fusel oil; diacetone alcohol; acetone; 85 percent ethyl acetate; and lower alkyl alcohols. Preferably the shellac solvent consists in whole, or in part, of a primary or secondary lower alkyl alcohol. Tertiary alcohols should be avoided or should constitute only a small portion of the shellac solvent. Such lower alkyl alcohols as methyl alcohol, ethyl alcohol, propyl alcohol, isopropyl alcohol, butyl alcohol, and the like, may be used. Mixtures of more than one solvent may be used. Where the terminology "shellac solvent" is employed throughout the specification and claims, this language is intended to denote a single organic solvent and also mixtures of more than one organic solvent for shellac. The total amount of solvent employed in the primer, of course, is dictated by the amount of shellac to be dissolved and the viscosity desired for the primer. For application of a primer by dipping or spraying techniques, a solids content of the primer of from about 3 to 20 percent by weight is desirable. The solids in the primer are considered as being the total weight of the shellac-chromate-phosphoric acid reaction product and other solid materials included in the primer, such as additional pigments. With some application techniques, primers having solids content ranging up to 50 percent by weight may be employed.

The chromate in the primer should be a metal chromate selected from the group consisting of the alkaline earth metal chromates. At least one alkaline earth metal chromate must be employed, although additional alkaline earth metal chromates and other conventional pigments may be included. Preferably the metal chromate is barium chromate, or strontium chromate, or basic zinc chromate, or a mixture of some or all of these chromates. It is essential that both an alkaline earth metal chromate and phosphoric acid be used to treat dissolved shellac, as a treatment by either without a treatment by the other does not afford the significant improvement of the invention. Conventional pigments and chromates other than the alkaline earth metal chromates also fail to provide the improvements of the invention, although their presence in the primers is permissible. The phosphoric acid solution may be prepared by dissolving a phosphoric acid, such as metaphosphoric acid, or orthophosphoric acid, or pyrophosphoric acid, in a suitable solvent, such as a mixture of water and an organic shellac solvent. Preferably the phosphoric acid solution comprises commercially available 85 percent orthophosphoric acid, water, and a shellac solvent.

Variation of the amounts of chromate and phosphoric acid in the primers of the invention is permissible with some attendant variation in the properties of the primers. Desirably on a weight basis, the amount of phosphoric acid is about one-half the weight of the shellac in the primer, although amounts of phosphoric acid from about 0.1 to 2 times the weight of shellac may be used. Desirably, the alkaline earth metal chromate on a weight basis is about equal to the weight of shellac in the primer, although amounts of chromate from about 0.2 to 4 times the weight of the shellac may be used. Within the aforementioned amounts there generally is a decrease in primer adhesiveness with amounts of phosphoric acid less than one-half the weight of the shellac and with amounts of chromate less than the weight of the shellac. Within the afore-mentioned amounts, there is little or no significant increase in primer adhesiveness with amounts of phosphoric acid greater than one-half the weight of the shellac and with amounts of chromate greater than the weight of the shellac. The preferred primer composition comprises a reaction product on a weight basis of one part of shellac, 0.3 to 1 part of phosporic acid, and 0.8 to 2 parts of an alkaline earth metal chromate. The ratio of shellac, phosphoric acid, and the chromate to each other within the afore-stated amounts should be such as to provide a reaction product solution having a pH of less than 4 and preferably about 2.5.

The WP-1-type shellac wash primers of the invention may be used in admixture with other wash primers. Conventional wash primers, such as a polyvinyl butyral clear wash primer or a WP-1-type polyvinyl butyral wash primer may be used. Also, shellac wash primers, such as shellac wash primers from treatment of shellac dissolved in an organic solvent with solutions of phosphoric acid and chromium trioxide may be admixed with the primers of the invention. Admixture of the WP-1-type shellac wash primers of the invention with such wash primers may be accomplished by conventional mixing techniques and means. These mixtures, containing a wash primer of the invention, generally exhibit a stability intermediate the stability of the component primers of the mixture and also provide prime films having properties intermediate the properties of the component primers.

To illustrate the advantages and the superiority of the primers of the invention, there was prepared a conventional WP-1-type polyvinyl butyral wash primer for comparison and control purposes as follows in Example A.

EXAMPLE A

A conventional WP-1-type polyvinyl butyral wash primer of the following composition was prepared.

| Base grind: | Parts (by weight) |
|---|---|
| Polyvinyl butyral resin | 72.0 |
| Basic zinc chromate | 69.0 |
| Talc | 11.0 |
| Lampblack | Trace |
| Isopropyl alcohol | 487.0 |
| Butyl alcohol | 161.0 |
| Acid diluent: | |
| 85 percent orthophosphoric acid | 36.0 |
| Water | 32.0 |
| Isopropyl alcohol | 132.0 |
| | 1000.0 |

The polyvinyl butyral resin was dissolved in the solvents of the base grind. The chromate, talc, and lampblack were added thereto, and the base grind prepared by grinding in a pebble mill until a smooth dispersion was obtained. The acid diluent components were mixed and the acid diluent slowly added to the base grind.

The resulting WP-1 PVB wash primer had a yellow green color, a solids content of approximately 18.3, and a viscosity of 29 seconds in a No. 4 Ford Cup at 80° F. It is generally recognized that this type of primer is stable and capable of use until about 8 hours after preparation, by which time the primer declines significantly in the ability of films applied therefrom to adhere.

The following examples serve to illustrate the invention: All parts in these examples are parts by weight unless noted otherwise.

EXAMPLE I

A pigmented WP-1-type shellac wash primer of the following composition was prepared.

| Base grind: | Parts |
|---|---|
| Refined, bleached, dewaxed shellac | 72 |
| Barium chromate | 73 |
| Talc (a natural pure white fibrous magnesium silicate, 99 percent of which passes through a U.S. No. 325-mesh screen, such as "Asbestine 3X," sold by International Pulp Co., New York, New York) | 11 |
| Ethyl alcohol | 185 |
| Butyl alcohol | 61 |
| Acid diluent: | |
| 85 percent orthophosphoric acid | 36 |
| Water | 32 |
| Ethyl alcohol | 430 |
| Butyl alcohol | 100 |
| | 1000 |

The base grind was prepared by placing its components in a pebble mill and grinding until a smooth dispersion was obtained (grinding to a Hegman gage reading of 7). The acid diulent was prepared by thoroughly mixing its components. The primer was then obtained by slowly adding the acid diluent to the base grind and thoroughly mixing the same.

The resulting pigmented WP-1-type shellac primer contained a shellac reaction product and had a light green color, a solids content of approximately 18.6 percent, a pH of 2.3, and a viscosity of 12.7 seconds in a No. 4 Ford Cup at 80° F.

EXAMPLE II

A pigmented WP-1-type shellac wash primer was prepared according to the procedure of Example I, except that 73 parts of strontium chromate replaced the 73 parts of barium chromate of Example I. The resulting reaction composition contained a shellac reaction product and had a yellow color, a solids content of approximately 18.6 percent, and a pH of 2.1.

EXAMPLE III

A pigmented WP-1-type shellac wash primer was prepared according to the procedure of Example I except that 36.5 parts of strontium chromate replaced one-half of the 73 parts of barium chromate of Example I. The resulting reaction composition contained a shellac reaction product and had a yellow color, a solids content of approximately 18.6 percent, and a pH of 2.2.

EXAMPLE IV

A pigmented WP-1-type shellac wash primer of the following composition was prepared.

| Base grind: | Parts |
|---|---|
| Refined, bleached shellac | 72.2 |
| Basic zinc chromate | 69.0 |
| Talc | 11.0 |
| Lampblack | Trace |
| Ethyl alcohol (commercial, denatured grade) | 186.4 |
| Butyl alcohol | 61.4 |
| Acid diluent: | |
| 85 percent orthophosphoric acid | 36.0 |
| Water | 32.0 |
| Ethyl alcohol (commercial, denatured grade) | 432.0 |
| Btuyl alcohol | 100.0 |
| | 1000.0 |

The base grind was prepared by grinding in a pebble mill until a smooth dispersion was obtained and the acid diluent was prepared by thorough mixng of its components. In preparing the primer, the acid diluent was slowly added to the base grind with stirring of the base grind.

The resulting pigmented WP-1-type shellac primer contained a shellac reaction product and had a yellowish-green color, a solids content of approximately 18.3 percent, and a viscosity of 12.8 seconds in a No. 4 Ford Cup at 80° F.

EXAMPLE V

A pigmented WP-1-type shellac wash primer of the following composition was prepared.

| Base grind: | Parts |
|---|---|
| Basic zinc chromate | 69.0 |
| Talc | 11.0 |
| Lampblack | Trace |
| n-Butyl alcohol | 30.0 |
| Ethyl alcohol | 90.0 |
| Shellac solution: | |
| Refined, bleached shellac | 72.0 |
| n-Butyl alcohol | 61.3 |
| Ethyl alcohol | 186.7 |
| Acid diluent: | |
| 85 percent orthophosphoric acid | 36.0 |
| Ethyl alcohol | 132.0 |
| Water | 32.0 |
| Extra solvent: | |
| Ethyl alcohol | 210.0 |
| n-Butyl alcohol | 70.0 |
| | 1000.0 |

The base grind of the dispersed pigments in the alcohols was prepared by grinding in a pebble mill until a smooth dispersion was obtained. The shellac solution was prepared by dissolving the shellac in its alcohol solvents. The acid diluent and extra solvent were prepared by mixing their respective components. 120 parts of the extra solvent were used to thin the base grind. The other 160 parts of the extra solvent, the shellac solution, and the acid diluent were then mixed together. This mixture was then slowly added to the diluted pigment grind to prepare the primer.

The resulting pigmented WP-1-type shellac wash primer contained a shellac reaction product and had a yellow-green color, a solids content of approximately 18.3 percent, and a viscosity of 13.0 seconds in a No. 4 Ford Cup at 80° F.

EXAMPLE VI

A mixture of wash primers was prepared by thoroughly mixing 20 percent by weight of a freshly prepared conventional WP-1-type polyvinyl butyral wash primer prepared according to Example A and 80 percent by weight of a pigmented WP-1-type shellac wash primer of the invention prepared according to Example I. The resulting primer mixture contained substantial amounts of a shellac reaction product and had a light color, and a solids content of approximately 18.5.

The shellac wash primers of the invention have been found to be relatively stable compositions. Even after storage of several months the shellac wash primers are capable of providing prime coatings, or films, superior to, or the equivalent of, prime coatings or films from conventional wash primers. Stabilities of the primers of Examples I through V were evaluated by storing the primers in partially filled, closed glass containers at normal research laboratory room temperatures. Stored primers were inspected periodically for evidence of instability and were applied to substrates and tested. For example, primers, as prepared in Examples I through III, upon storage for several months underwent little or no apparent change. During storage these WP-1-type shellac wash primers retained an acid pH and a low viscosity sufficient to permit application to metal surfaces by spraying and dipping techniques. For example, after six months of storage the primer of Example I had a pH of 1.9 and the primer of Example II had a pH of 1.6. In some primers, a small amount of settling and flocculation of the pigment occurred during storage. This settled pigment was redispersed upon mixing and agitation and, generally, with flocculation also being removed or diminished upon thorough mixing. No appreciable detriment in the applied prime films was noted whether a small amount of pigment flocculation was or was not present in the primers as applied. The primers of Examples I and II, after storage for periods as long as 6 months or longer, when applied to metal surfaces, exhibited substantially the same adhesiveness as obtained with the freshly prepared and applied primer.

In contrast to the stability of the WP-1-type shellac wash primers of the invention, the conventional WP-1-type polyvinyl butyral wash primer, as prepared in Example A, was relatively unstable. The conventional WP-1-type primer of Example A commenced to increase in pH within less than 8 hours and, about 8 to 10 hours after preparation, had increased in pH to such an extent that it was not capable of providing good adhesion. The primer of Example A, after storage for several months, still exhibited these properties of increased pH and poor adhesion.

For test purposes, WP-1-type shellac wash primers of this invention were applied to surfaces of various materials. Primers were applied to 1-mil-thick, 99 percent pure aluminum foil, aluminum foil laminated to paper, and glass panels. To eliminate any difference due to non-uniform film thickness, a wire-wound rod or Pamarco roller was used to draw down uniform coatings of approximately 0.1-mil dry-film thickness. Coatings were permitted to air dry at normal room conditions. Primers were also applied to panels of sheet steel about 2⅞ x 5⅞ inch. These panels, while apparently both physically and chemically clean, were solvent-cleaned with alcohol just prior to application of the primers. Cold-rolled, 3 x 9-inch steel panels were used. These panels also were solvent cleaned just prior to application of the primers. Conventional spraying techniques were used to apply prime coatings having a dry-film thickness of 0.3 to 0.5 mil, to most of the steel, with dipping techniques used for only a few panels. The applied coatings were permitted to air-dry at normal room conditions.

For control and comparison purposes, the conventional WP-1-type polyvinyl butyral wash primer of Example A was applied to surfaces of aluminum foil and panels of steel and aluminum by the same procedures by which the wash primers of the invention were applied to such surfaces.

Protective finishes were applied over the prime coats on various substrate materials. Generally, two coats of a protective paint or lacquer were applied by spraying over the prime coat with approximately 48 hours elapsing between coats. With alkyd-resin protective finishes, a total dry-film thickness for the prime-film plus topcoatings was approximately 3.0 mils, and, with vinyl resin and other protective finishes, the total dry-film thickness for the prime-film plus topcoatings was approximately 2.0 mils. For the protective finishes, the following were used: a Class A, Olive Drab, TT-E-489 alkyd enamel (meeting Military Specification MIL-E-489); a vinyl formulation comprising a vinyl chloride-vinyl acetate resin (VYHH), aluminum powder, toluene, methyl isobutyl ketone, and tricresyl phosphate; a nitro-cellulose-base lacquer; an acrylic-base finish; and a number of other conventional protective organic-base finishes.

A pressure-sensitive tape test was used to evaluate the adhesiveness of the prime coatings to the various surfaces and also of the protective finish topcoatings to the prime coatings. In this test, short lengths of a ¾-inch adhesive cellophane tape are pressed firmly down over several areas of each test panel. These tapes are then pulled rapidly away from the panel with observations made as to absence of removal, or amount or removal of the prime coat or the topcoatings. The degree of adhesion is reported in a numerical manner, with the following code: 4 signifies complete or substantial removal of the film or topcoatings; 3 signifies partial removal up to about one-half of the film or topcoatings; 2 signifies spotty removal of only a small amount of the film or topcoatings; and 1 signifies no removal of the film or topcoatings. The following table, Table 1, presents illustrative representative results of a number of these adhesion tests.

*Table 1.—Adhesiveness*

| Primer | Degree of Adhesion | | | | |
|---|---|---|---|---|---|
| | Prime Coating Only | Prime Coating Plus Protective Topcoatings | | | |
| | | Alkyd | Vinyl | Acrylic | Nitro-cellulose |
| Shellac | 4 | 4 | 4 | 4 | 4 |
| Example A | 1 | 1 | 4 | 1 | 2-3 |
| Example I | 1 | 1 | — | — | 1 |
| Example II | 1 | 1 | — | — | 1 |
| Example III | 1 | 1 | — | — | 1 |
| Example IV | 1 | 1 | 1 | 1 | 1 |
| Example V | 1 | 1 | 1 | 1 | 1 |

(—) Not tested.

Immersion tests were conducted on coated test panels of cold rolled steel having a prime coat plus protective coatings thereover. Test panels were immersed in a bath of deionized water maintained at about 95° F. Test panels also were immersed in a 5 percent by weight aqueous solution of sodium chloride or a 20 percent by weight aqueous solution of sodium chloride maintained at about 95° F. Panels were tested in duplicate with one unmarked panel and a second scribed panel having a large "X" scratched through the coating on the panel. Each panel, after immersion in a particular bath for a period often as high as three weeks, was examined and rated for blisters.

Salt-fog exposure tests were conducted on test panels having a prime coat plus two coats of a protective finish. Duplicate sets of unmarked and "X" scribed panels were exposed in accordance with the procedure of ASTM Specification B-117-54T for 300 hours to a 5 percent by weight sodium chloride solution. Duplicate sets of panels were examined and inspected after 150 hours of exposure and 300 hours of exposure and rated for blisters.

In the examination and rating of exposed panels, adhesion was evaluated and rated by scraping with a knife edge. Exposed panels were examined and rated for blisters according to the following code: D signifies a dense amount of blisters; MD signifies a medium-to-dense amount of blisters; M signifies a medium amount of blisters; F signifies a few blisters; 10 signifies no blisters; 8 signifies very small blisters; 6 signifies medium-size blisters; 4 signifies medium-to-large size blisters; and 2 signifies large blisters. Numerals intermediate the even numerals signify blister sizes intermediate the sizes designated by adjacent numerals. Table 2 presents illustrative representative results of a number of these tests.

*Table 2.—Blisters*

| Panel Material | Prime Coating | Protective Topcoating | Test | | | |
|---|---|---|---|---|---|---|
| | | | Deionized $H_2O$ | Aqueous NaCl Solution | Salt Fog Test | |
| | | | | | 150 Hours | 300 Hours |
| Steel | None | Alkyd TT-E-489 | 5 M | 4 M to 6 F | 8 M | 8 M |
| Do | A | do | 6 MD | 8 M | 8 M | 8 M |
| Do | A | Vinyl-al-pig | 8 F | 10 | — | — |
| Do | II | Alkyd TT-E-489 | 8 M | 10 | 10 | 10 |
| Do | III | do | 7 F | 10 | 10 | 10 |
| Do | IV | Vinyl-al-pig | 10 | 10 | — | — |
| Do | V | do | 8 M | 10 | — | — |

(−) Not tested.

Accelerated-weathering tests were conducted on test panels having a prime coat plus two coats of a protective finish. Duplicate sets of unmarked and "X" scribed panels were exposed in an Atlas Weatherometer sold by Atlas Electrical Devices Company of Chicago, Illinois. In this test the panels were exposed to repeated cycles of 102 minutes of ultra violet light and 18 minutes of ultraviolet light with a water spray. The exposed panels were examined and rated after 150 and 300 hours of exposure for adhesion, blisters, and corrosion resistance.

In the accelerated weathering tests, panels having a prime coating of the WP-1-type shellac wash primer of the invention generally found to be equal to panels having a prime coating of a conventional WP-1-type polyvinyl butyral wash primer in adhesiveness, nonblistering, and corrosion resistance.

The preceding test results illustrate the superiority, in many respects, of the WP-1-type shellac wash primers of the invention to conventional WP-1-type wash prime coatings, shellac prime coatings, and unprimed substrates. It is evident that numerous changes may be made in the compositions of the WP-1-type shellac wash primers of the invention without departing from the true spirit and scope of the invention. For certain applications, the particular substrate to be coated, the particular protective finish to be applied, and the conditions to which the finished coated substrate will be subjected, will each influence the choice of chromate pigment-to-resin ratio, particular chromate pigment, additional pigment if any, solvents and ratio of solvents to shellac, ratio of phosphoric acid to shellac, and the like. Generally, it will be found that the compositions set forth in the examples provide the desired satisfactory results with these preferred examples provided for purposes of description and illustration.

In the absence of limitations, other than set forth expressly in the preceding description, it is to be understood that it will be apparent to one skilled in the art that many changes and embodiments of the invention may be made that will fall within the true spirit and scope of the invention and that the invention is to be limited only to the extent as set forth in the appended claims.

What is claimed is:

1. A modified shellac wash primer coating composition consisting essentially of a shellac solvent solution of the reaction product from mixing 0.3–1 part by weight of phosphoric acid, 0.8–2 parts by weight of a chromate selected from the group consisting of the alkaline earth metal chromates, basic zinc chromate, and mixtures thereof, and 1 part by weight of shellac in a shellac solvent, the composition having a pH below 4 and a solids content from 3 to 20 percent by weight.

2. The modified shellac wash primer coating composition of claim 1 in which the chromate is barium chromate.

3. The modified shellac wash primer coating composition of claim 1 in which the chromate is strontium chromate.

4. The modified shellac wash primer coating composition of claim 1 in which the chromate is basic zinc chromate.

5. The modified shellac wash primer coating composition of claim 1 in which the composition has a pH of about 2.5 and the reaction product is of 0.5 part by weight of phosphoric acid, 1 part by weight of the chromate, and 1 part by weight of shellac.

6. In combination, a metal base and a coating therefor of the composition as defined by claim 1 applied to said base and dried.

7. In a method of preparing a modified shellac wash primer coating composition, characterized by the ability even several months after preparation to serve as a prime coating, by adhesion to metals, and by the ability to inhibit the corrosion of metals, the step of mixing 0.1–2 parts by weight of phosphoric acid, 0.2–4 parts by weight of a chromate selected from the group consisting of the alkaline earth metal chromates, basic zinc chromate, and mixtures thereof, and 1 part by weight of shellac in a shellac solvent to form a shellac solvent solution of the reaction product thereof.

8. In a method of preparing a modified shellac wash primer composition, characterized by the ability even several months after preparation to serve as a prime coating for a protective organic finish thereover, by adhesion to metals, and by the ability to inhibit the corrosion of metals, the step of mixing 0.3–1 part by weight of phosphoric acid, 0.8–2 parts by weight of a chromate selected from the group consisting of the alkaline earth metal chromates, basic zinc chromate, and mixtures thereof, and 1 part by weight of shellac in a shellac solvent at 60–100° F. to form a shellac solvent solution of the reaction product thereof.

9. The method of claim 8 including dissolving the shellac in shellac solvent, adding and dispersing the chromate therein, and mixing a solution of water, shellac solvent, and the phosphoric acid therewith.

10. A modified shellac wash primer coating composition consisting essentially of a shellac solvent solution of the reaction product obtained by mixing 1 part by weight of shellac with 0.1 to 2 parts by weight of phosphoric acid and 0.2 to 4 parts by weight of a chromate selected from the group consisting of the alkaline earth metal chromates, basic zinc chromate, and mixtures thereof.

11. The composition of claim 10 in which the coating composition has a pH below 4 and contains a solids content of from 3 to 20 percent by weight.

12. A coating of the composition of claim 10 after drying.

13. In combination, a metal base and a coating of the composition of claim 10 applied to said base and dried.

References Cited in the file of this patent

UNITED STATES PATENTS

| | | |
|---|---|---|
| 1,909,935 | Dreyfus | May 23, 1933 |
| 2,227,720 | Kallander et al. | Jan. 7, 1941 |
| 2,425,023 | Bassford | Aug. 5, 1947 |
| 2,525,107 | Whiting et al. | Oct. 10, 1950 |
| 2,798,009 | Gault | July 2, 1957 |
| 2,838,419 | Francis | June 10, 1958 |